United States Patent

[11] 3,612,107

| [72] | Inventor | Frederick G. J. Grise |
| | | West Brookfield, Mass. |
| [21] | Appl. No. | 11,581 |
| [22] | Filed | Feb. 16, 1970 |
| [45] | Patented | Oct. 12, 1971 |
| [73] | Assignee | Novelty Tool Company, Inc. |
| | | Spencer, Mass. |

[54] GAS PROOF TUBE CLOSURE SEAL
15 Claims, 11 Drawing Figs.

[52] U.S. Cl. .................................................... 138/89,
24/19, 24/135, 292/313, 285/382, 339/219,
72/410
[51] Int. Cl. ....................................................... F16l 55/10,
F16l 55/14
[50] Field of Search............................................. 138/89;
287/64, 65, 20.3, 79; 24/16, 19, 256, 243 H, 243
CC, 277 HE, 135 A; 292/307, 313; 285/382;
339/219; 49/475, 498; 174/77; 72/409, 410

[56] References Cited

UNITED STATES PATENTS

| 676,415 | 6/1901 | Brooks ....................... | 292/313 |
| 2,747,935 | 5/1956 | Szantay ..................... | 138/89 |
| 2,809,651 | 10/1957 | Moberg ..................... | 292/307 |
| 3,082,794 | 3/1963 | Wahl .......................... | 138/29 |
| 3,084,961 | 4/1963 | Merriman ................... | 138/89 X |
| 3,121,271 | 2/1964 | Blomberg ................... | 24/141 |
| 3,124,409 | 3/1964 | Nisula ........................ | 24/125 |

FOREIGN PATENTS

| 1,444 | 1898 | Great Britain ............... | 287/20.3 |

*Primary Examiner*—Herbert F. Ross
*Attorney*—Charles R. Fay

ABSTRACT: A closure is for floating tube, including two pair of part being provided with a multiple rib structure cooperating to squeeze the tube, deforming the same and flowing material thereof in an inward direction upon itself, between the ribs.

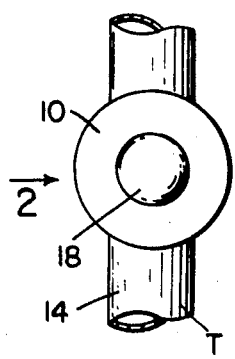
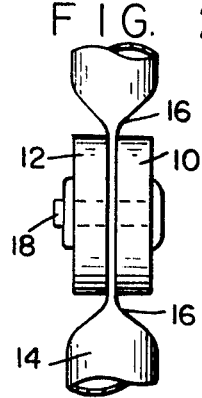
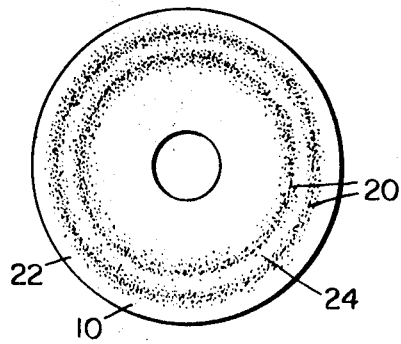
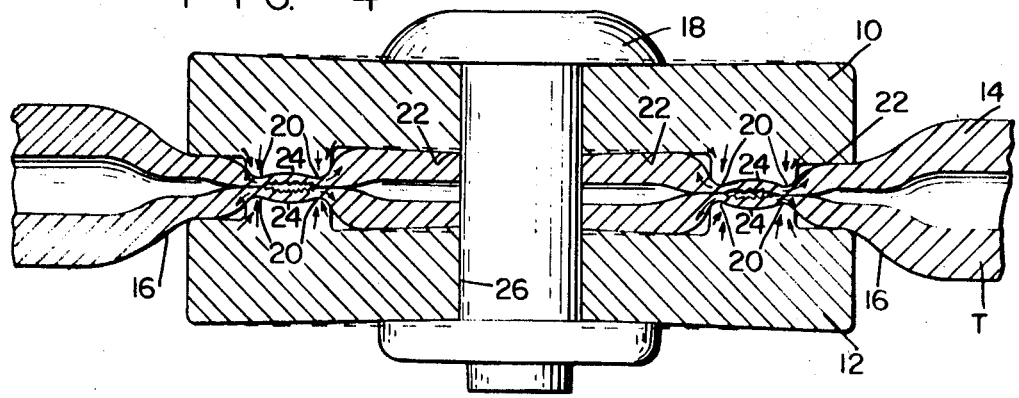
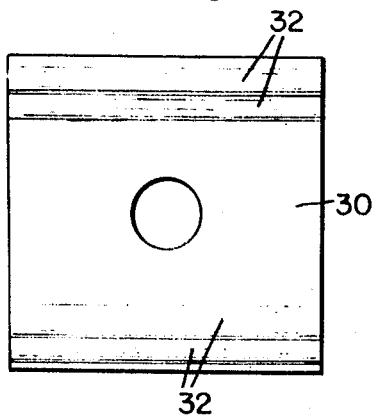
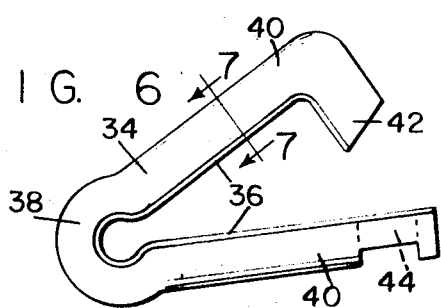
INVENTOR
FREDERICK G. J. GRISE
BY Charles R. Fay,
ATTORNEY

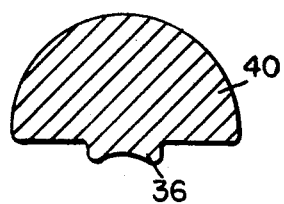
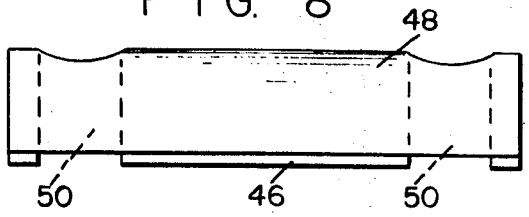
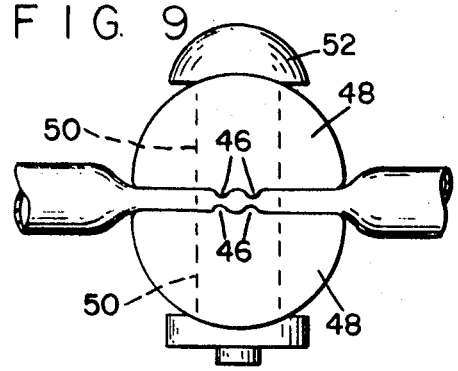
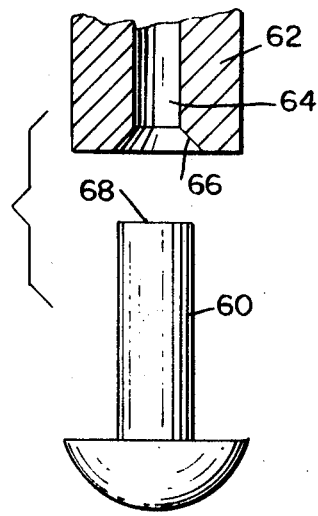
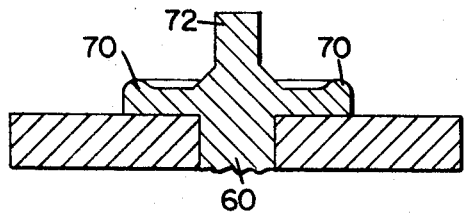

GAS PROOF TUBE CLOSURE SEAL

BACKGROUND OF THE INVENTION

In modern apparatuses utilizing Freon and especially Freon 22 it is a difficult and expensive time consuming operation to seal the tubes entering the particular appliance through which the gas has been injected. Freon 22 is extremely pervasive and unless an extremely good seal is provided the gas will easily leak. At the present time it is necessary to solder the tubes closed, an expensive and time consuming process, and the reason that this is necessary is that until the present there is no mechanical seal which prevents the Freon 22 from leaking. It is the object of the present invention to provide a simple inexpensive and positive seal which is easy to apply, long lasting, and leak proof.

SUMMARY OF THE INVENTION

When the appliance has had the gas injected into it through the usual copper tubing, a clamplike closure seal is applied to the tubing, squeezing the walls of the tubing together. The parts of the seal have corresponding ribs extending across the same in parallelism there being a pair of ribs on each portion of the clamp, said ribs coming together under pressure, for instance of an air tool, power punch, etc. squeezing the tubing, deforming the material thereof, and flowing the material inwardly upon itself in the areas between the ribs. In this way an extremely powerful and positive seal is provided through which even Freon 22 cannot leak. By deforming the metal and flowing it in the way stated, the metal actually becomes more dense in the areas between the ribs. Means is then provided for securing the parts of the seal together in permanent relationship by any effective means, and the seal of course is then left in position on the tubing leading to the appliance.

One connecting means used is a rivet passing directly through a pair of the sealing parts, which may be rectangular or circular, with the ribs projecting from corresponding surfaces thereof and being guided in such a way as for instance by the rivet to come together at the place desired. In the case of a circular seal the ribs also may be circular and thus form a pair of separate and spaced sealing areas on the tubing with a rivet extending through a punched hole in the tubing, the rivet being then crimped in such a way as to provide for a permanent connection which cannot be disturbed or distorted even under conditions of hard usage, uneven temperature, etc.

In the case of a rectangular pair of sealing members there may be provided a pair of ribs at each side of a central rivet. Other forms the invention may take without departing from the basic invention reside in a one-piece clip type which is bent and then the parts connected; and in a two-piece bar type employing a pair of rivets outside of the area of the tubing. The clip and bar types do not require the tubing to be punched, and the rivet may be an integral part of one side of the clamp.

BRIEF DESCRIPTION OF THE DRAWINGS

FIG. 1 is a plan view showing a form of the invention in use;

FIG. 2 is a side view looking in the direction of arrow 2 in FIG. 1;

FIG. 3 is an enlarged view of the ribbed side of a seal part;

FIG. 4 is a greatly enlarged sectional view illustrating the action of the seal parts on the tubing;

FIG. 5 shows a rectangular form of the invention;

FIG. 6 illustrates a clip or scissor type of the invention;

FIG. 7 is a section of the material of the clip;

FIG. 8 illustrates the bar type of the invention;

FIG. 9 is an end view of the bar type of the invention showing the parts in position;

FIG. 10 is an exploded view of a rivet and rivet tool; and

FIG. 11 is a sectional view showing the action of a rivet tool.

PREFERRED EMBODIMENT OF THE INVENTION

As shown in FIGS. 1 and 2 a pair of discs or circular sealing members or parts 10 and 12 are crimped onto a tubing 14 and under pressure squeezing the tube walls together, distorting the same as illustrated at 16—16. A rivet generally indicated at 18 is then applied through corresponding holes through the two sealing members and the tube, holding the parts together and the tubing 14 in clamped flattened condition as illustrated generally in FIG. 2.

In FIGS. 3 and 4 there is shown on an enlarged scale the ribbing referred to. The sealing members are each provided with a pair of ribs here indicated at 20—20. FIG. 4 shows the cross-sectional shape of these ribs. The ribs are circular and concentric and are located inwardly from the peripheries of the discs 10 and 12, extending forwardly from the flat face 22 of the respective disc to a certain predetermined depth. Between each pair of ribs there is a concaved annular trough or the like, the ribs gradually inclining upwardly to the peaks which are rounded, down into the cavity at 24 between the ribs. The faces at 22 of the respective sealing parts are reduced considerably below the floor of the cavities 24.

The sealing discs 10 and 12 may be provided with central holes for application of a rivet as at 26 thereto. This rivet extends through the tubing itself, indicated at T, binding the two sealing discs 10 and 12 into the required position wherein the tubing is flattened out. The deforming and metal flowing action is intended to be illustrated by the arrows indicated in FIG. 4. These arrows show that not only is the metal actually compressed between the respective ribs but it is also extruded both inwardly and outwardly relative to the cavities at 24. This is due to the construction of the ribs and the concavity between them which act as metal forming dies. In this way the metal is actually compacted and made denser at the ribs, and this allows the walls of the tubing to be pressed together tight enough for the required seal. The gas cannot possibly leak through the seal thus made so that it will be seen that completely impervious seals are provided. The ribs are spaced from the edges of the sealing members, forming flats 28, 28. These flats prevent vibration under rough handling in the areas of the crimped tubing and thus prevent breakage.

In the form of the invention so far described there are two of these seals, one at each side of the rivet and extending across the tubing in slightly arcuate form, the sealing discs 10 and 12 extending laterally beyond the confines of the sides of the tubing T.

In FIG. 5 there is shown a similar seal part which is square or rectangular and is indicated at 30. In this case the ribs 32—32 are in the conformation shown in FIG. 4, but they are straight and of course in this case form the double seal across the tubing, the tubing being applied at right angles with respect to the lengths of these ribs. Ribs 32 are placed inwardly of the edges of the parts 30, as are ribs 20—20, and for the same reason.

Referring now to FIG. 6, a wire member may be drawn having the section shown in FIG. 7. That is a wire 34 may be drawn with a pair of longitudinal ribs 36—36 thereon, these ribs being the same as above described and shown in FIG. 4. This wire is then bent into the clip form shown in FIG. 6 with a hinge at 38 and the copper tubing can be squeezed between the two arms indicated at 40—40. Some kind of fastening means may be used, such as an anchor 42 to be extended through an aperture 44 and then bent over and headed like a rivet.

A two part structure can be used without cutting the tubing (also not necessary in FIG. 6). In this case bars are formed such as shown in FIG. 8 with the ribs 46 thereon, these again being similar to those described in FIG. 4. A pair of these bars indicated at 48 may then receive the tubing transversely thereof and rivets can be applied to the end openings 50—50, outside the area of the tube.

Any convenient and powerful enough mechanism can be used to clamp the sealing parts together (or to close the clip in FIG. 6). However it has been found that it is necessary in some cases to provide against relaxation or expansion of the metal of the seal parts under different conditions of heat; and to this end, when the rivet is applied, it is given an extra force in such a way as to cause a slight dishing inwardly of the surfaces 22—22 lying between the ribs, this being in the nature of an overpressure. In this case the metal can expand without any effect on the clamped tubing and considerable warping and hard usage with respect to the discs fails to result in any damage to the discs or to the sealing action on the tubing.

In addition it has been found that a new improved form of rivet head can be utilized which will not under any circumstances relax. Referring now to FIG. 10 there is shown a rivet 60 and a punch 62 having a central hollow portion 64 and a beveled mouth at 66. This is Utilized to impinge upon the end 68 of the rivet thus forming and flowing the metal to a position which is shown in FIG. 11. In this case the metal has flowed upwardly slightly as at 70, the remainder of this head at 72 being reduced from the diameter of end 68.

I claim:

1. A closure seal for a metal tube, said seal comprising a pair of elements located at opposite sides of the tube and secured together to collapse and close the tube therebetween, and cooperating aligned rib means on facing surfaces of said elements deforming cold flowing and compacting the material of the wall of the tube.

2. The closure seal of claim 1 including means holding said elements in sealing relationship with respect to said tube.

3. The closure seal of claim 1 including a rivet extending through and holding said sealing elements in sealing relationship with respect to said tube.

4. The closure seal of claim 1 including a rivet holding said sealing elements in sealing relationship with respect to said tube, said rivet extending through the tube and the sealing elements.

5. The closure seal of claim 1 wherein the material deforming means comprises a pair of cooperating spaced ribs on each element.

6. The closure seal of claim 5 including a cavity between each pair of ribs.

7. The closure seal of claim 5 including a cavity between each pair of ribs, said cavities each having a floor located outwardly beyond the face of the respective sealing element.

8. The closure seal of claim 1 wherein said material deforming means comprises a rib structure, means holding said sealing elements together in sealing relationship, there being a ribbed structure at either side of said holding means in a direction along the length of the tube.

9. The closure seal of claim 1 wherein said material deforming means comprises a rib structure, means holding said sealing elements together in sealing relationship, there being a ribbed structure at either side of said holding means in the direction of the length of the tube, each of said rib structures comprising a pair of spaced ribs.

10. The closure seal of claim 1 wherein said sealing elements are circular and the material deforming means comprises a rib structure on each element, said rib structures being annular.

11. The closure seal of claim 10 including means securing said sealing elements together generally centrally of said elements.

12. The closure seal of claim 1 wherein said sealing elements are generally rectangular and the metal deforming means comprises a rib structure on each of the facing surfaces thereof, each rib structure appearing adjacent opposite edges of said rectangular sealing elements being spaced inwardly from the edges thereof and corresponding in position with respect to each other.

13. The closure seal of claim 1 including means securing said sealing elements together, said last-named means being located outside the area of the tube.

14. The closure seal of claim 1 wherein said sealing elements are elongated and integral and can be bent together, and said material deforming means comprises cooperating ribs extending lengthwise of said elements.

15. The closure seal of claim 1 wherein said sealing elements comprise a pair of like bars, said bars being adapted to extend transversely with respect to said tube, the material deforming means being located on facing surfaces of said bars and comprising projecting ribs cooperating with each other to deform the metal of the tube.